United States Patent [19]

Scolari

[11] Patent Number: 4,489,306
[45] Date of Patent: Dec. 18, 1984

[54] EMERGENCY SIGNAL

[75] Inventor: John E. Scolari, La Mesa, Calif.

[73] Assignee: Life Light Systems, San Diego, Calif.

[21] Appl. No.: 466,326

[22] Filed: Feb. 14, 1983

Related U.S. Application Data

[63] Continuation of Ser. No. 318,499, Nov. 5, 1981, abandoned.

[51] Int. Cl.³ ............................................. B60Q 1/00
[52] U.S. Cl. .................................... 340/107; 340/77;
340/81 R; 340/82; 340/84; 340/87; 340/90;
340/105; 340/114 B; 116/63 P; 40/610; 40/612;
40/571
[58] Field of Search ..................... 340/107, 84, 87, 90,
340/94, 102, 103, 114, 110, 116, 119, 122, 123,
81 R, 77, 105; 116/63 R, 63 P, 63 C, 63 T;
40/612, 610, 564, 571, 573, 574

[56] References Cited

U.S. PATENT DOCUMENTS

| 2,717,336 | 9/1955 | Craddock | 340/77 |
| 2,800,601 | 7/1957 | Martin et al. | 340/77 |
| 2,905,863 | 9/1959 | Martin et al. | 340/77 |
| 3,233,352 | 2/1966 | Projector et al. | 116/63 C |
| 3,496,904 | 2/1970 | Rimkus | 116/63 C |
| 3,738,309 | 6/1973 | Nicholl | 340/114 B |
| 4,006,702 | 2/1977 | St. Cyr | 116/63 P |
| 4,081,788 | 3/1978 | Gaspar | 340/84 |

FOREIGN PATENT DOCUMENTS 2602862  7/1977  Fed. Rep. of Germany ...... 340/119

Primary Examiner—Donnie L. Crosland
Attorney, Agent, or Firm—Baker, Maxham, Callan & Jester

[57] ABSTRACT

A self-contained emergency signal has a base unit which contains a battery and an optional radio transmitter and a plurality of telescoping box-like stages which nest into the base member to convert it into a small container for storage and transport. Each of the boxes and the light mounting panels are cut in a special way to permit nesting of the boxes within the base container. When deployed for use the unit is extended into a vertical (or horizontal) array of sequentially illuminated letters which spell out the word "HELP" or a similar word or different color panels, there being a control to sequentially flash strobe lights positioned behind each letter.

22 Claims, 10 Drawing Figures

U.S. Patent  Dec. 18, 1984  Sheet 1 of 2  4,489,306
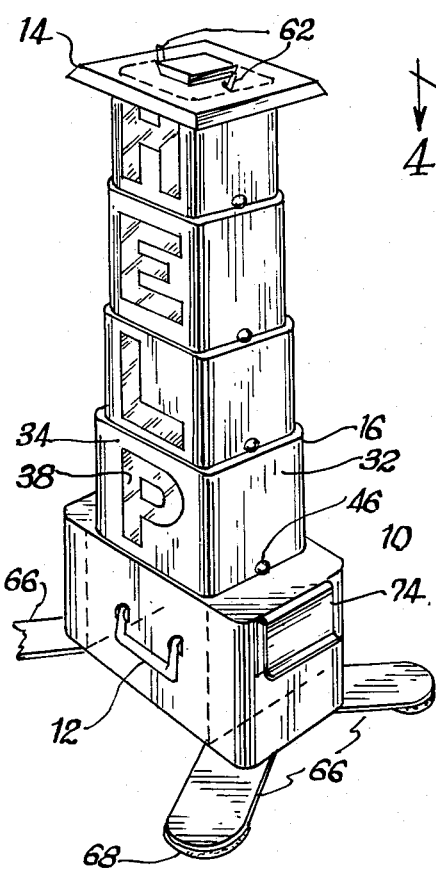
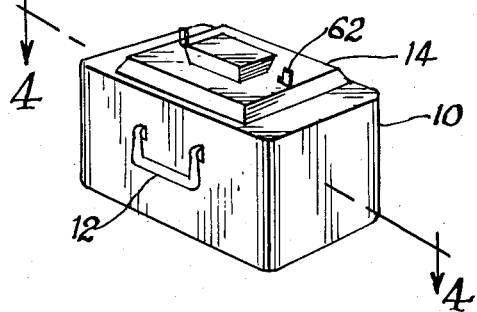
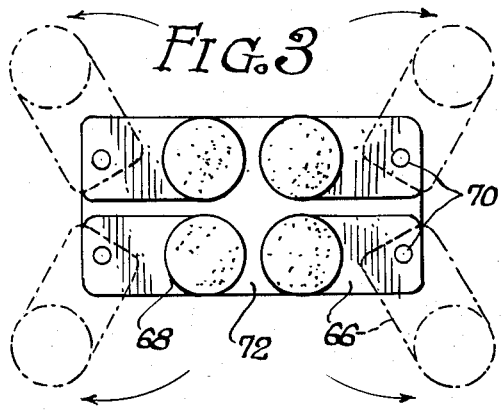
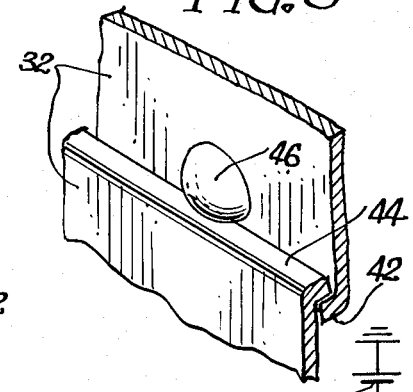
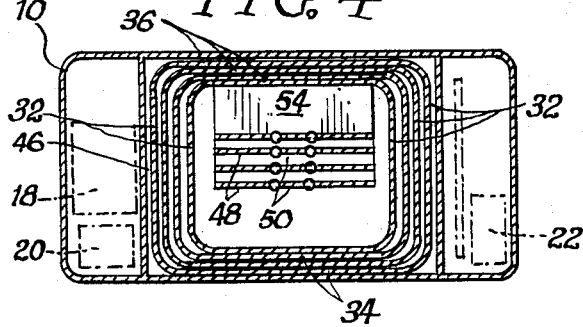
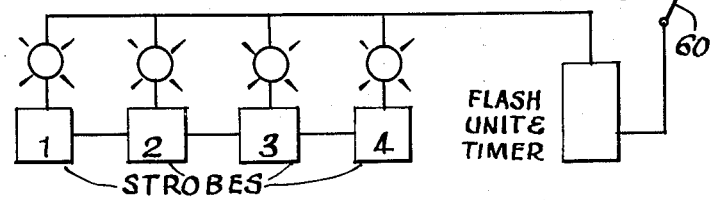

U.S. Patent Dec. 18, 1984 Sheet 2 of 2 4,489,306
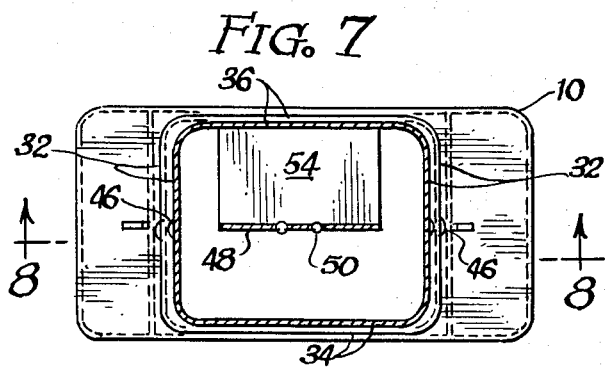
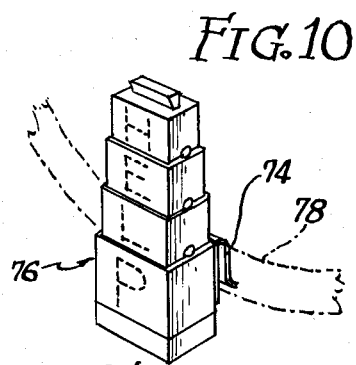
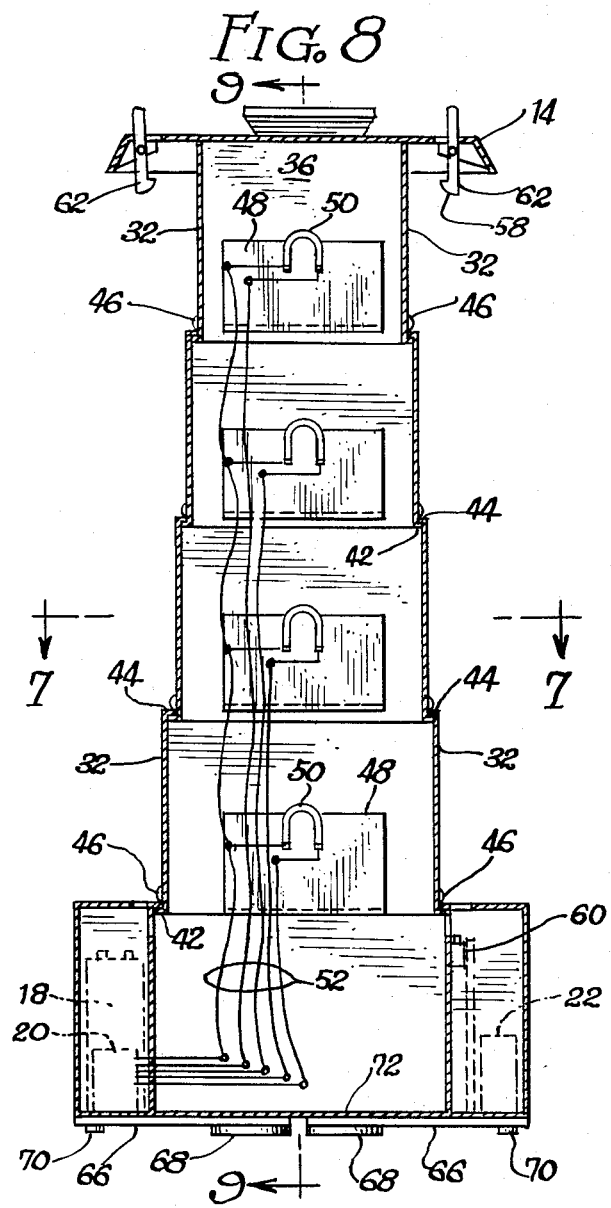
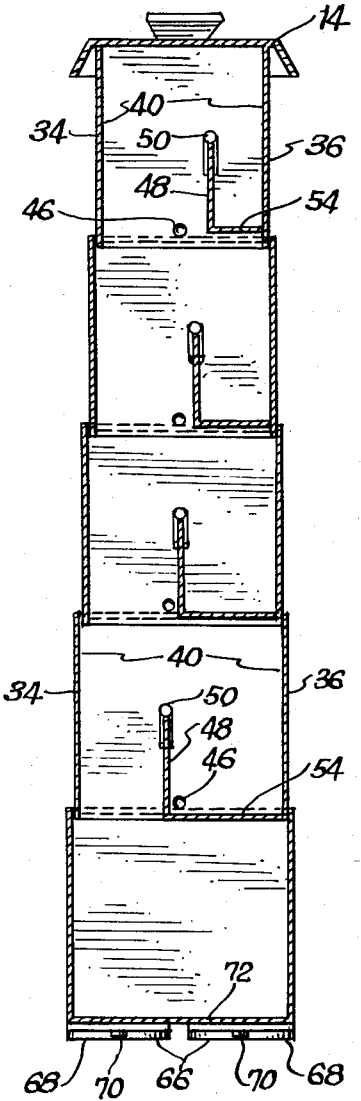

EMERGENCY SIGNAL

The present application is a continuation of application Ser. No. 318,499 filed Nov. 5, 1981, now abandoned entitled Emergency Signal.

BACKGROUND OF THE INVENTION

The invention is in the field of good emergency signal devices. These devices are needed in various forms in a number of different situations. By the sheer number of vehicles that are disabled on the highways, there is the obvious highway application for an emergency signal.

Backpackers and campers also need some type of emergency signal device. Especially in the west and southwest United States, backpackers may become lost in deserts, in mountains woods, in the snow and in other situations in which search crews may not find them in time to save their lives. This is particularly a problem with children who wander from campsites or from trails and perish in the wilderness.

In addition to the traffic safety lighting modifications to the basic design, the emergency signal can be easily adapted for downed aircraft and disabled boats. Mountain climbers and desert motorcyclists and those who could find themselves in a dangerously precarious position would find a compact and lightweight model vital. This telescoping emergency flash device is easily adapted to most any emergency situation.

Some situations may call for a radio-transmitter for help in isolating the victims by an aerial search crew with radio search techniques. Other situations call for a visual means of finding the victims, or a visual means of notifying others that there is a problem, such as along the highway.

Yet another and rarely addressed emergency situation involves invalids and particularly old people. If suddenly stricken with a debilitating problem, a low-cost remote controlled sign that would flash "HELP", or simply light control panels, in the window, could save the lives of old people who are so stricken they are unable to get to the telephone.

There is a need, therefore, for a compact, nestable emergency signal that lends itself to a wide variety of applications and is relatively economical to manufacture and produce.

SUMMARY OF THE INVENTION

The instant invention fulfills the above stated needs, and is adaptable, particularly by the addition of a remote control for invalids or a radio transmitter for downed planes, backwoods and nautical applications, to virtually any of the emergency situations that would arise.

The invention consists of a base box which is used as a compact container when the signal is not in use, with a series of sequentially smaller telescoping boxes which extend upwardly into an upright column when the unit is deployed.

Each of the telescoping boxes have two faces which have a letter either cut out or otherwise displayed thereon. If cut out, the letter faces would be backed by a translucent, colored panel. Panel colors may be selected to provide maximum visibility under different weather conditions. Inside each cube is a reflector panel parallel to the letter face, which mounts a light, so that each letter pair corresponding to each box has its own individual light. A photographic-type strobe light may be used for greater visibility.

The base member which supports the upright column also contains a battery and a timing mechanism so that the letters flash in sequence. The resultant moving light source maximizes the probability of the signal being noticed under adverse conditions, for example, when used in the woods. Due to the relatively low current requirements of the strobe lamps, a large sign may be operated with a minimum amount of energy, which will extend battery life and permit operation of the unit for extended periods. Each box is retained in place by a pair of detents which rest on the upper edges of the box beneath, and may be deflected very simply with pressure to cause the telescoping and nesting of the apparatus. The lower base container is provided with swivel feet which may have magnetic inserts to both broaden the base of the unit and enable it to be magnetically attached to ferromagnetic surfaces, such as vehicle bodies. An extendable clip may be mounted on the base of the unit, which permits the device to be attached to a car window when desired.

BRIEF DESCRIPTION OF THE DRAWINGS

FIG. 1 is a perspective view of the unit deployed for use;

FIG. 2 is a perspective view of the unit nested for transport and storage;

FIG. 3 is an elevation view of the bottom of the unit showing the feet deployed in phantom;

FIG. 4 is a section taken along line 4—4 of FIG. 2;

FIG. 5 is a perspective detail illustrating a typical deflected detent tab;

FIG. 6 is a diagrammatic illustration of the electrical system;

FIG. 7 is a section taken along line 7—7 of FIG. 8;

FIG. 8 is a vertical section taken through the unit relating to FIG. 7 as indicated by lines 8—8 of FIG. 7;

FIG. 9 is a section taken along line 9—9 of FIG. 8; and

FIG. 10 is an isometric view of a modification of the unit in which it is made smaller and provided with a belt clip for personal use.

DETAILED DESCRIPTION OF THE PREFERRED EMBODIMENT

The signal device is shown virtually completely in FIG. 1. A base member 10 comprises a container with a handle 12 so that when the lid 14 seats on the base member and is latched as will be described below, the unit is contained in a small container as shown in FIG. 2 for convenience of transport and storage. The top panel of container 10 has a rectangular cutout into which telescopically slides the first box-like stage 16. Inside the compartments contain a battery 18 and a strobe and timer unit 20, as shown in FIGS. 4 and 8. On the other side in another compartment is an optional transmitter 22. If the unit incorporates a transmitter, an antenna mechanism will be incorporated into the stacked stage structure.

Stage 1 indicated at 16 varies slightly in size and detail from the other stages, but they are sufficiently similar that only one will be described in detail. Each cubic section has a pair of lateral walls 32 and a front and rear wall, recited in the claims as longitudinal walls, 34 and 36, respectively. The front and back walls 34 and 36 each have a cutout 38 in the shape of a letter, backed by a translucent, colored sheet 40, shown in FIG. 9.

Each stage has a lower lip 42 and an upper shoulder 44 to limit the vertical extension of the unit so they do not separate. To maintain them in an extended position, a pair of detents 46 on each of the stages rest upon the shoulders 44 of the stage beneath, wit the stage 16 engaging the base member 10. These detents are preferably slight protrusions molded as part of the telescoping stages.

Spaced behind the front face 34 of each of the stages is a reflector panel 48, each of which supports a separate light 50. These are preferably strobe lights, i.e. lights that produce a high intensity flash immediately upon being triggered. The strobe lights in the illustrated embodiment are mounted centrally in a cutout in the reflector, so that an identical set of letters, identically numbered at 38, can be cut in the rear face 36. It would also be possible to use only one set of letters on the front panel, and position the strobe lights on the forward surface of the reflective baffles.

The connections to each of the strobe lights must be made individually as they are preferably fired sequentially rather than simultaneously. A wiring network 52 connects the strobe timer unit 20 to each of the lights as shown.

Each of the reflector baffles 48 is supported generally parallel to the front and rear faces of the respective section on a thin planar support 54 extending from one side of the respective stage. These supports, as shown in FIG. 4, full flush against one another when the stages are telescoped together. It is intended that when expanded into its utilization mode each of the sections fits snugly with adjoining sections so that the unit will not admit rain or snow into its interior. Further, steps could be taken to actually waterproof the unit if the environment in which it is to be used calls for this.

The top 14 of the structure, as best shown in FIGS. 1 and 8, includes a detent/switch actuator 58 which actuates normally closed switch 60 in the base member 10 when the unit is retracted. In this position, the top is retained on the base, power is removed, and the stages are retained nested within the base container by a latch 62.

A clip 74, best shown in FIG. 1, could be incorporated as an optional feature for use in engaging the unit on a partially raised car window. The same concept can be carried forth when the device is used on a small personal unit indicated at 76 in FIG. 10, in which case the clip would be used to attach the unit to a belt, indicated at 78. In order to provide more additional stability for the unit, feet 66 with magnetic terminal pads 68 are pivoted at 70 to the bottom 72 of the base as shown in FIG. 3. These feet lend stability in applications in which wind, irregular terrain, or both, could otherwise topple the box.

Thus, the unit is compact and convenient for transport and storage when not deployed, and can quickly be extended in an emergency situation. When extended, it automatically locks in the extended position and initiates the light flashing sequence, so that despite being in a state of shock, an emergency victim could still possibly have the presence of mind to actuate the mechanism simply by pulling the lid fully up into the position illustrated in FIG. 1. Several optional features and variations are possible. If for use in the window of an elderly person or invalid, a remote control actuator may be used in place of the automatic switch 60, and the front faces of the letter blocks covered with a thin, plastic sheet of the same color as the rest of the box so that the letters "HELP" would not appear until the device was turned on. Additionally the cross sectional shape of the unit could be made cylindrical, elliptical, or triangular, or any other shape, provided that the basic telescopic nature of the unit as set forth in the disclosure is retained.

While I have described the preferred embodiment of the invention, other embodiments may be devised and different uses may be achieved without departing from the spirit and scope of the appended claims.

What is claimed is:

1. An emergency signal comprising:
    (a) a box-like base;
    (b) a plurality of four-sided telescoping boxes of incrementally decreasing size deployable from a stored mode nested within said base to an expanded, vertically extended mode;
    (c) detent means for releasably retaining said boxes in the extended mode;
    (d) each of said boxes having a light-transmitting letter of the alphabet displayed on at least one face thereof such that the totality of said letters on said boxes spell an emergency message;
    (e) means inside each of said boxes illuminating the respective letter thereon;
    (f) a top attached to the uppermost of said boxes; and
    (g) latch means for latching said top to said base with said boxes inside to define a self-contained container when not in use.

2. Structure according to claim 1 wherein said light means comprises a light for each separate one of said letters and a power distribution system for sequentially illuminating said lights to spell out said emergency message letter by letter, and continuously repeat this sequence.

3. Structure according to claim 1 wherein said signal is battery powered and said base and top contain cooperating switch means to automatically close the light means circuit with said battery when said top is raised to deploy said boxes in vertically extended array.

4. Structure according to claim 1 wherein each of said boxes has a pair of opposed lateral sides and a pair of longitudinal sides, at least one of said longitudinal sides displays the respective letter thereon, and said light means includes a reflector panel mounted parallel to and spaced from the side displaying the respective letter and each of said panels mounts an individual light.

5. Structure according to claim 4 wherein said reflector panels are mounted to and span between the lateral sides of the respective boxes, and said panels are mounted on lateral supports extending from one of the walls of the respective box.

6. Structure according to claim 5 wherein each of said panels is offset from the panel of the next larger box to permit nesting of said boxes.

7. Structure according to claim 1 wherein said base mounts a clip so that the signal can be clipped to a partially opened vehicle window.

8. Structure according to claim 1 wherein said detent means comprises outwardly extended projections on each box to rest on the upper edge of the box below.

9. Structure according to claim 1 wherein said base includes a plurality of outwardly pivotal legs to widen the support of said base.

10. Structure according to claim 9 wherein said legs each mounts a magnet such that said signal can be securely engaged on a ferromagnetic surface.

11. Structure according to claim 1 wherein said base includes a handle and said base and top define a small container for transport in the collapsed mode.

12. An emergency signal comprising:
    a base;
    a plurality of signalling means extending from said base, each said signalling base including an enclosure and being spaced a different distance from said base and including high intensity flash lamp means inside each said enclosure;
    a like plurality of window means in at least one side of said enclosure, each said window means being adjacent and spaced from one of said high intensity flash lamp means; and
    actuating means in said base electrically connecting said signalling means through switch means to battery means;
    whereby high intensity light flashes are generated through said window means when said switch means is closed, said flash lamp means being fired in a fixed repeatable sequence.

13. An emergency signal according to claim 12 wherein said high intensity flash lamp means and said actuating means comprise a strobe unit.

14. An emergency signal according to claim 12 wherein the signaling means is in telescoping arrangement with said base whereby the signaling means can be retracted into said base when not in use.

15. An emergency signal according to claim 14 wherein said window means include indicia thereon.

16. An emergency signal according to claim 15 wherein said actuating means includes a power distribution system for flashing said flash lamp means in predetermined sequence.

17. An emergency signal according to claim 14 wherein a cover is attached to the top of said signaling means in the extended mode and latch means is provided for latching said cover to said base to define a portable self-contained container when not in use.

18. An emergency signal according to claim 17 wherein said base and cover contain cooperating switch means to automatically close the circuit through the high intensity flash lamp means when said cover is raised to deploy said signalling means in vertically extended array.

19. An emergency signal comprising:
    a base;
    signalling means spaced from said base and including high intensity flash lamp means;
    window means in said signalling means adjacent said high intensity flash lamp means; and
    actuating means in said base electrically connecting said signalling means through switch means to battery means;
    said signalling means comprising a plurality of telescoping sections of incrementally decreasing size deployed from a stored mode nested within said base to a vertically extended mode, each of said sections comprising a high intensity flash lamp means and a window means adjacent said high intensity flash lamp means;
    whereby high intensity light flashes are generated through said window means when said switch means is closed.

20. An emergency signal according to claim 19 wherein said window means are of different colors.

21. An emergency signal according to claim 19 wherein said actuating means includes a power distribution system for sequentially flashing said flash lamp means.

22. An emergency signal comprising:
    a base;
    at least two signalling means, at least one of said signalling means being in telescoping arrangement with said base, said one signalling means being adapted to be spaced from said base when in the extended mode and being adapted to be retracted into said base when in the stored mode, each said signalling means including high intensity flash lamp means;
    at least two window means, each of said window means being positioned adjacent one of said high intensity flash lamp means;
    actuating means in said base electrically connecting said signalling means through switch means to battery means;
    whereby high intensity flashes are generated through said window means when said switch means is closed.

* * * * *